United States Patent [19]
Suwa

[11] Patent Number: 5,867,348
[45] Date of Patent: Feb. 2, 1999

[54] DISK DRIVE ACTUATOR ASSEMBLY WITH ROTATIONAL IMBALANCE COMPENSATION

[75] Inventor: Masaya Suwa, Kawasaki, Japan

[73] Assignee: Fujitsu Limited, Kawasaki, Japan

[21] Appl. No.: 966,552

[22] Filed: Nov. 10, 1997

Related U.S. Application Data

[63] Continuation of Ser. No. 538,924, Oct. 4, 1995, abandoned.

[30] Foreign Application Priority Data

Mar. 17, 1995 [JP] Japan ................................. 7-059534

[51] Int. Cl.$^6$ ........................................................... G11B 5/55
[52] U.S. Cl. ............................................................. 360/106
[58] Field of Search ..................................... 360/104, 105, 360/106; 29/434; 74/572, 573 R

[56] References Cited

U.S. PATENT DOCUMENTS 4,787,132  11/1988  Kilgore ..................................... 29/434
4,817,454  4/1989  Schopf et al. ........................ 74/573 R

FOREIGN PATENT DOCUMENTS 63-10379  1/1988  Japan .
574072  3/1993  Japan .
5250824  9/1993  Japan .

Primary Examiner—John H. Wolff
Attorney, Agent, or Firm—Greer, Burns, & Crain, Ltd.

[57] ABSTRACT

An actuator assembly for a magnetic disk drive having a structure capable of easily removing the imbalance of the actuator assembly. The actuator assembly includes a shaft fixed to a base of the disk drive, a bearing having an inner race fixed to the shaft, a sleeve fixed to an outer race of the bearing, and an actuator arm unit fixed to the sleeve. The sleeve has a side wall formed with a hole opening in a direction of canceling the imbalance of the actuator assembly.

20 Claims, 10 Drawing Sheets

DISK DRIVE ACTUATOR ASSEMBLY WITH ROTATIONAL IMBALANCE COMPENSATION

This application is a continuation of application Ser. No. 08/538,924 filed on Oct. 4, 1995 abandoned.

BACKGROUND OF THE INVENTION

1. Field of the Invention

The present invention relates to an actuator assembly for a magnetic disk drive.

2. Description of the Related Art

In recent years, size reduction and capacity enlargement have been desired in a magnetic disk drive as a kind of external storage for a computer. In association with the size reduction of the magnetic disk drive, an actuator capable of positioning a head with high precision is necessary.

In a magnetic disk drive for a computer, a flying magnetic head is usually used to avoid damage to the head and a magnetic disk due to contact with each other. That is, while the magnetic disk is being rotated at a high speed, a head flying force generated by an air flow due to high-speed rotation of the disk balances a force of a spring for pressing the head on the disk, so that the head is kept at a microscopic flying height from the disk to perform read/write of data on the disk.

In this type of magnetic disk drive, the distance between the head and the disk has a large influence on the data read/write performance of the head. Accordingly, an actuator capable of positioning the head with high precision is required. An example of means for positioning the actuator with high precision is such that bearings for supporting the actuator are constructed as a unit to rotatably support the actuator by the use of such a bearing unit.

The bearing unit is press-fitted within a substantially cylindrical bore formed in an actuator block. The bore has a sectional shape as formed by cutting away a part from a complete round. The bearing unit is in plural-point contact with the inner wall surface of the actuator block defining the bore by screws retracting the bearing unit. This structure prevents distortion of the actuator due to a difference in the coefficient of linear expansion between the actuator and the bearing unit.

In paying attention to a rotational direction of the actuator about the axis of rotation thereof, it is important to consider how to reduce the torque generated in the actuator due to the application of external acceleration, in order to improve the performances of shock resistance and vibration resistance. If the center of rotation of the actuator is not aligned with the center of gravity of the actuator, torque is generated in the actuator upon application of external acceleration. This torque is proportional to the amount of misalignment of the center of gravity, and causes offtrack of the head during the operation of the disk drive. Further, misalignment of the center of gravity operates as a force of canceling a parked state of the actuator in the inoperative condition of the disk drive.

Further, in paying attention to a vertical direction of the actuator, it is important to consider how to suppress vibrations in the seek operation, so as to improve the seek performance. If the rotational force created by the voice coil motor (VCM), which rotates the actuator assembly about a rotational axis, is not aligned with the center of gravity of the actuator, the vibrations generated in the actuator in the seek operation become larger. As a result, there is a problem of increased access time.

For these reasons, it is necessary to reduce the imbalance of the actuator in both the rotational direction and the vertical direction thereof, in order to improve the performance of the magnetic disk drive. If the imbalance of the actuator remains, the performances of shock resistance and vibration resistance are reduced, and settling time is increased because of residual vibrations in the seek operation.

Conventionally, a balancer is added to the actuator to cancel the imbalance of the actuator. However, the addition of the balancer to the actuator causes an increase in inertia of the actuator, resulting in a deterioration in acceleration performance of the actuator. Furthermore, the size reduction of the disk drive makes it difficult to ensure a space for mounting the balancer.

SUMMARY OF THE INVENTION

It is therefore an object of the present invention to provide an actuator assembly for a disk drive having a structure which can easily remove the imbalance of the actuator assembly.

In accordance with an aspect of the present invention, there is provided an actuator assembly for a disk drive having a base, comprising a shaft fixed to the base; a bearing having an inner race fixed to the shaft and an outer race; a sleeve fixed to the outer race of the bearing; and an actuator arm unit fixed to the sleeve, the actuator arm unit having one end for supporting data read/write heads and another end for supporting a moving coil; wherein the sleeve has a side wall formed with a hole opening in a direction of canceling imbalance of the actuator assembly.

Preferably, the actuator arm unit comprises an actuator block fixed to the sleeve and a plurality of actuator arms extending from the actuator block in one direction, the actuator arms having front ends for supporting the data read/write heads. Further, the actuator assembly further comprises a flexible printed circuit sheet mounted on a side surface of the actuator block, for supplying a write signal to each head and taking out a read signal from each head; wherein the hole formed through the side wall of the sleeve is directed to a position where the flexible printed circuit sheet is mounted.

Instead of forming the hole through the side wall of the sleeve, the side wall of the sleeve may be partially cut away at a position of canceling the imbalance of the actuator assembly. Alternatively, an axial hole may be formed in the sleeve so as to be eccentric in a direction of canceling the imbalance of the actuator assembly.

In accordance with another aspect of the present invention, there is provided an actuator assembly for a magnetic disk drive having a base, comprising a bearing having an outer race fixed to the base and an inner race; a shaft fixed to the inner race of the bearing; and an actuator arm unit fixed to the shaft, the actuator arm unit having one end for supporting data read/write heads and another end for supporting a moving coil; wherein the shaft has a side surface formed with a partially cutaway portion facing in a direction of canceling imbalance of the actuator assembly.

As described above, the mass of the sleeve side wall or the shaft side surface is partially removed at a given position, thereby canceling the imbalance of the actuator assembly as a whole. Further, since the mass is partially removed, there is another advantage such that the inertia of the actuator assembly is reduced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
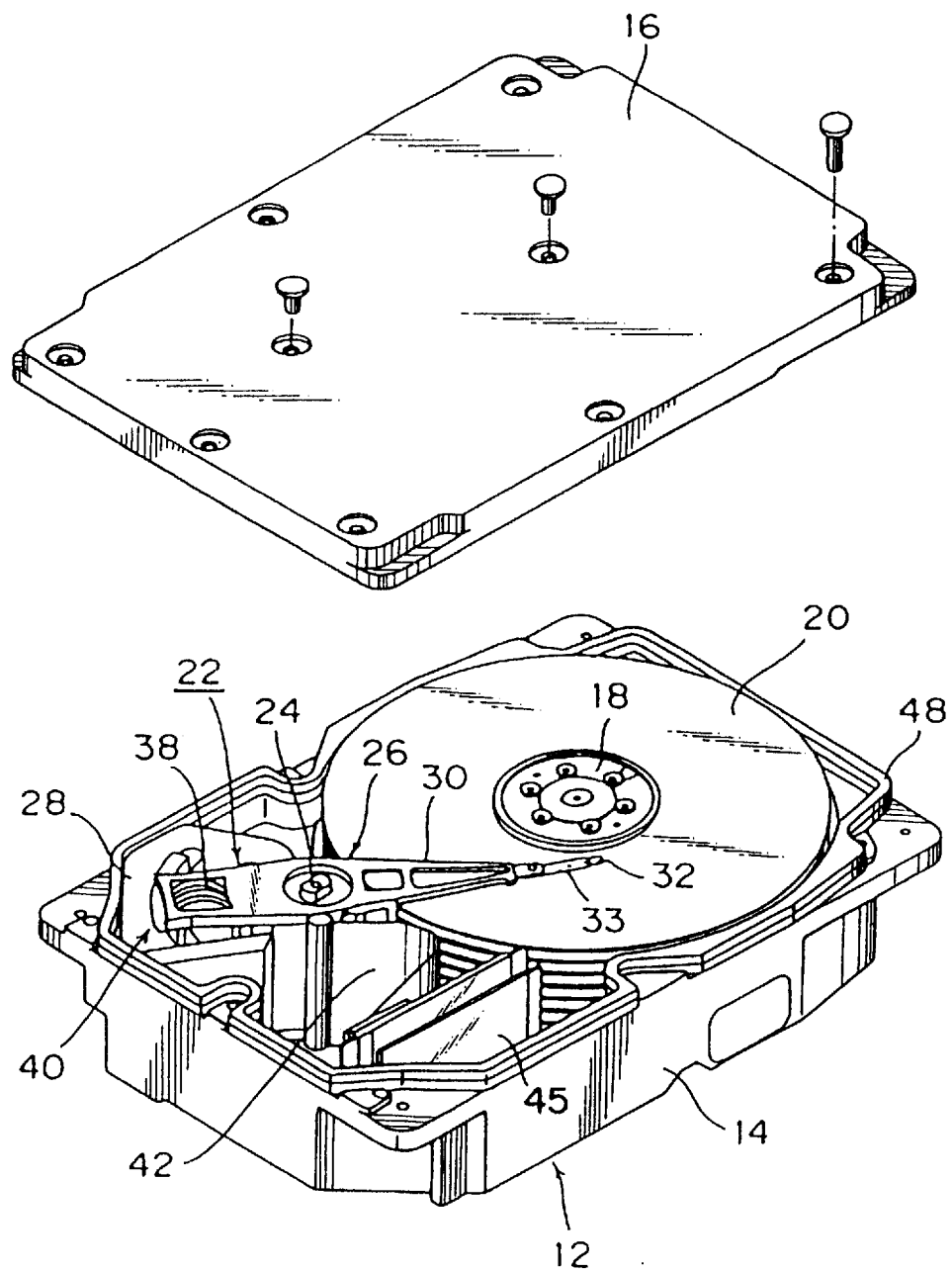
FIG. 1 is a perspective view of a magnetic disk drive to which the present invention is applied.

Referring to FIG. 1, there is shown a perspective view of a magnetic disk drive including a rotary actuator assembly according to the present invention. Reference numeral 12 denotes a housing (disk enclosure) composed of a base 14 and a cover 16. A spindle hub (not shown) to be rotatably driven by an inner hub motor (not shown) is provided on the base 14. A plurality of magnetic disks 20 and spacers (not shown) are alternately stacked and mounted on the spindle hub. That is, the plurality of magnetic disks 20 are regularly spaced from each other by the spacers and are fixedly mounted on the spindle hub by securing a disk clamp 18 to the spindle hub with screws.

Figure 3:
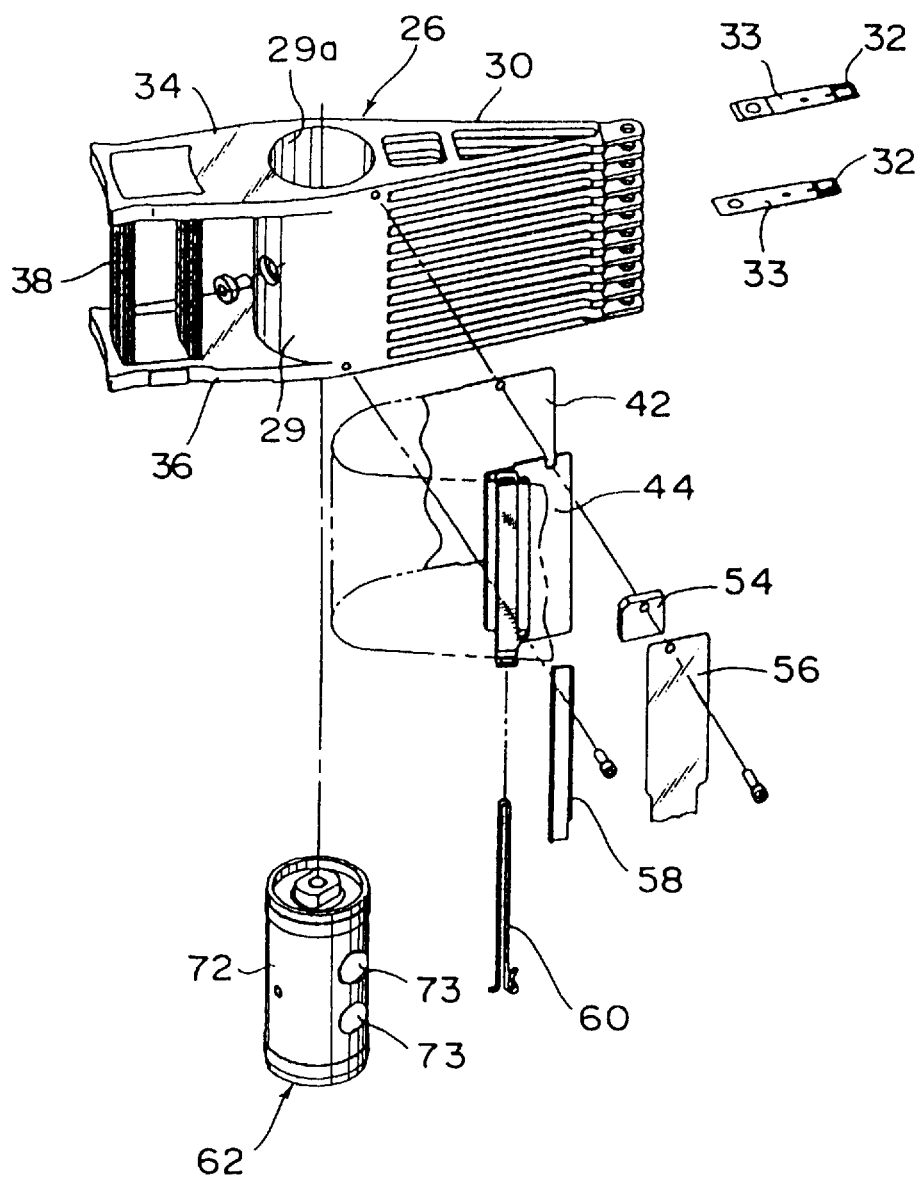
FIG. 3 is an exploded perspective view of a first preferred embodiment of the present invention.

Reference numeral 22 denotes a rotary actuator assembly composed of an actuator arm unit 26 and a magnetic circuit 28. The actuator arm unit 26 is rotatably mounted about a shaft 24, which is fixed at its both ends to the base 14 and the cover 16. As best shown in FIG. 3, the actuator arm unit 26 includes an actuator block 29 defining an axially extending bore 29a therein, a plurality of actuator arms 30 extending from the actuator block 29 in one direction, and a pair of coil supporting members 34 and 36 extending from the actuator block 29 in another direction opposite to the direction of extension of the actuator arms 30.

A plurality of spring arms 33 are fixed to the front ends of the actuator arms 30, and a plurality of magnetic heads 32 are supported on the front ends of the spring arms 33. A moving coil 38 is supported by the pair of coil supporting members 34 and 36. The magnetic circuit 28 and the moving coil 38 inserted in gaps defined in the magnetic circuit 28 constitute a voice coil motor (VCM) 40. Reference numeral 42 denotes a flexible printed circuit sheet (FPC) for supplying a write signal to each magnetic head 32 and for taking out a read signal from each magnetic head 32. One end portion of the FPC 42 is formed to have a given shape along a guide plate 44, and is fixed to a side surface of the actuator block 29. The other end portion of the FPC 42 is fixed to the base 14 by a fixing member 45, and is connected to a connector 46.

Figure 2:
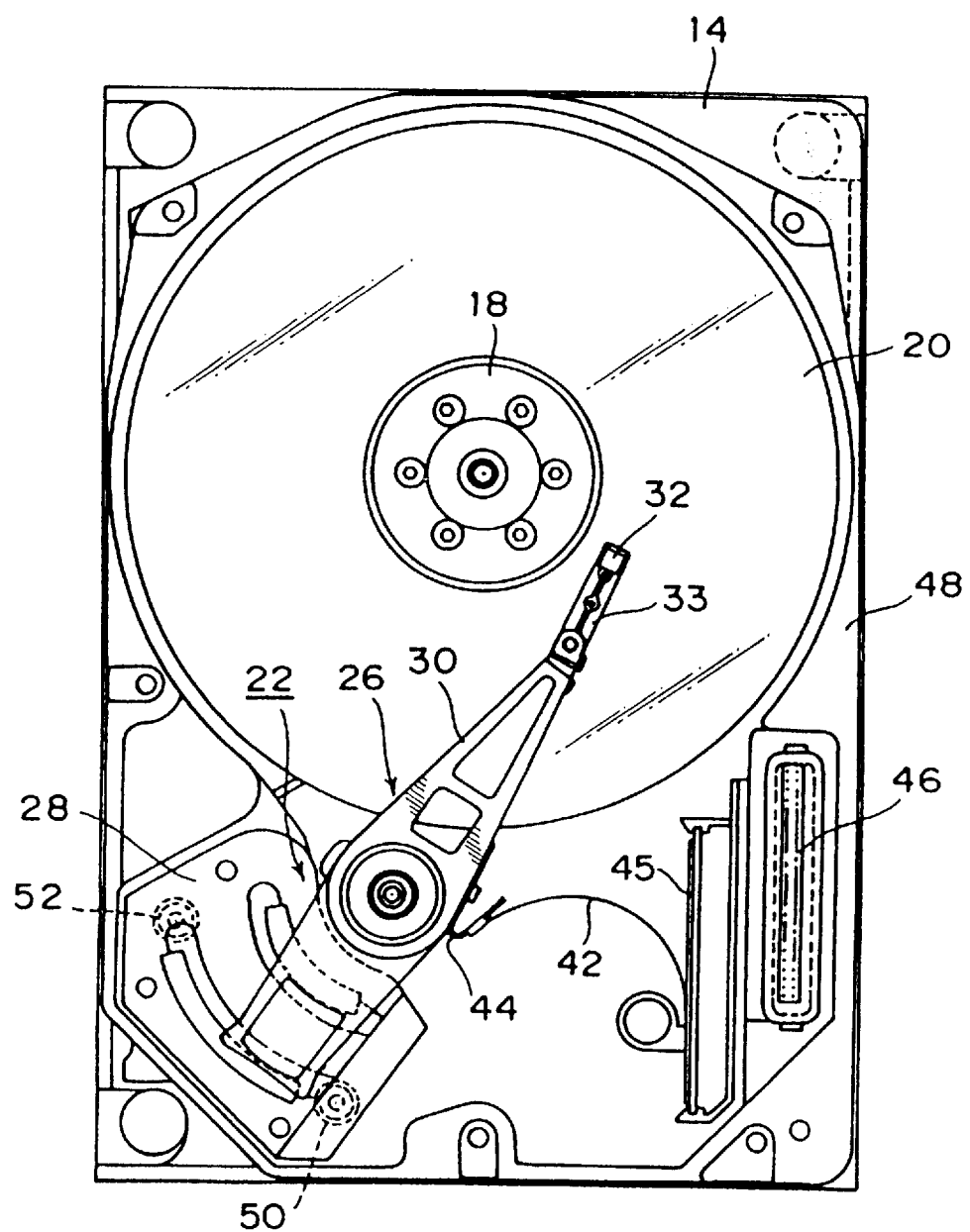
FIG. 2 is a top plan view of the magnetic disk drive shown in FIG. 1.

Referring to FIGS. 1 and 2, an annular packing assembly 48 is mounted on the base 14, and the cover 16 is secured by screws to the base 14 with the packing assembly 48 interposed therebetween, thereby sealing the housing 12. As shown by dotted lines in FIG. 2, an inner stopper 50 for stopping the actuator arm unit 26 near the innermost cylinder of the disks 20 and an outer stopper 52 for stopping the actuator arm unit 26 near the outermost cylinder of the disks 20 are provided on the base 14 so as to abut against the coil supporting member 36 (Shown in FIG. 3).

Referring to FIG. 3, there is shown an exploded perspective view of a first preferred embodiment of the present invention. One end portion of the FPC 42 is formed along the guide plate 44. The guide plate 44 is secured by screws to a side surface of the actuator block 29 together with a spacer 54 and an FPC 56 mounting a servo IC thereon. Thus, the FPC 42 is fixed at its one end portion to the side surface of the actuator block 29. Further, an intermediate portion of the FPC 42 is fixed to the guide plate 44 by pinching the FPC 42 and the guide plate 44 with a fixing pin 60 through an FPC holding rubber member 58.

Figure 4:
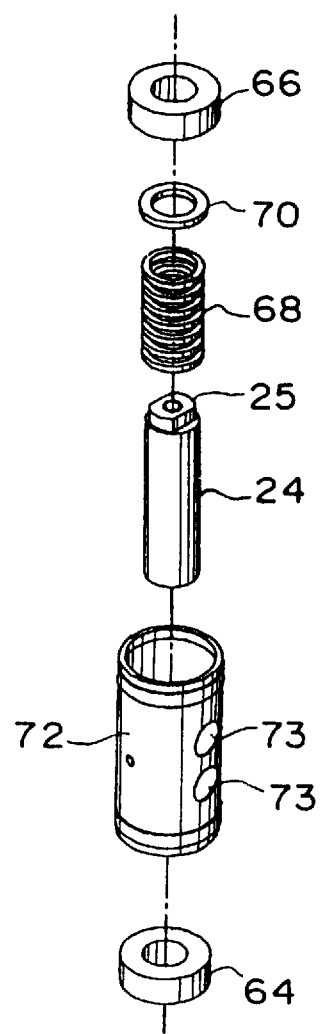
FIG. 4 is an exploded perspective view of a bearing unit shown in FIG. 3.

Reference numeral 62 denotes a bearing unit, which is composed of parts shown in FIG. 4. The lower end of the shaft 24 is fixed to the base 14, and the upper end of the shaft 24 is fixed to the cover 16 by a nut 25. The inner race of a bearing 64 is fixed to a lower end portion of the shaft 24. A bearing 66 is mounted on an upper end portion of the shaft 24 by the nut 25 with a preload spring 68 and a washer 70 interposed between the bearings 64 and 66. Accordingly, the inner race of the bearing 66 is fixed to the shaft 24. Reference numeral 72 denotes a cylindrical sleeve. The side or cylindrical wall of the sleeve 72 is formed with two round holes 73.

The bearings 64 and 66 are press-fitted within the sleeve 72. Accordingly, the outer races of the bearings 64 and 66 are fixed to the sleeve 72, thus completing the bearing unit 62. The bearing unit 62 is press-fitted within the bore 29a of the actuator block 29. Accordingly, the actuator arm unit 26 is rotatably mounted through the bearing unit 62 to the shaft 24.

The round holes 73 formed through the side wall of the sleeve 72 are directed so as to cancel the imbalance of the actuator assembly 22. That is, an imbalance is positively produced in the bearing unit 62 to thereby cancel the imbalance of the actuator assembly 22. More specifically, since the FPC 42 is fixed to the side surface of the actuator block 29, the center of gravity of the actuator arm unit 26 is shifted from the center of rotation of the actuator arm unit 26 to the fixed side of the FPC 42. To compensate for such shifting, the round holes 73 are formed through the side wall of the sleeve 72 so as to be directed to the fixed side of the FPC 42, thereby canceling the imbalance of the actuator assembly 22.

Figure 5A:
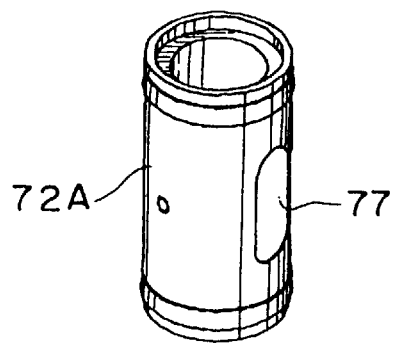
FIGS. 5A and 5B are perspective views showing other preferred embodiments of a sleeve shown in FIG. 4.
Figure 5B:
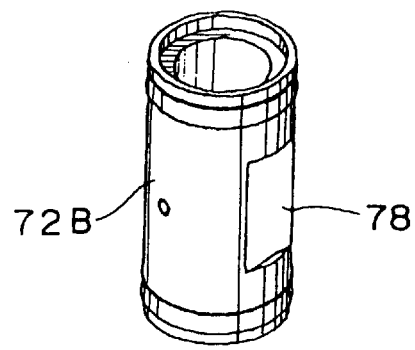

FIG. 5A shows a modification of the sleeve 72. This modification is effective in the case where the imbalance to be canceled is large. In this modification, an elongated hole 77 is formed through the side wall of a sleeve 72A. Alternatively, the number of round holes 73 shown in FIG. 4 may be adjusted. FIG. 5B shows another modification of the sleeve 72. In this modification, the side wall of a sleeve 72B is partially cut to form a flat surface 78 facing in the unbalanced direction, that is, opposed to the fixed side of the FPC 42. The use of this sleeve 72B produces imbalance in the bearing unit 62 to thereby cancel the imbalance of the actuator assembly 22.

Figure 6A:
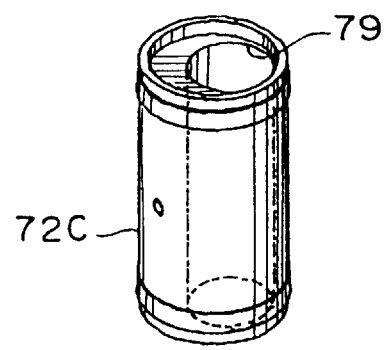
FIGS. 6A and 6B are perspective views showing still other preferred embodiments of the sleeve.
Figure 6B:
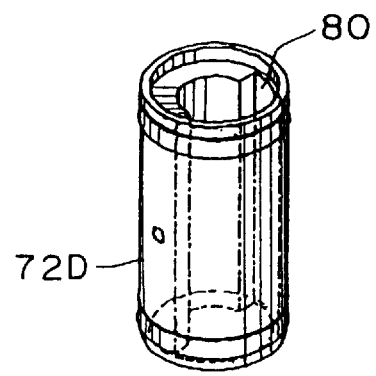

FIGS. 6A and 6B shows other preferred embodiments of the sleeve 72. In the preferred embodiment shown in FIG. 6A, a sleeve 72C has an axially extending round hole 79 eccentric in the unbalanced direction, that is, eccentric toward the fixed side of the FPC 42. The use of this sleeve 72C produces imbalance in the bearing unit 62 to cancel the imbalance of the actuator assembly 22. While the axial hole 79 parallel to the axis of rotation of the actuator assembly 22 is formed by drilling, it may be formed by drawing to thereby reduce the manufacturing cost. In the preferred embodiment shown in FIG. 6B, a sleeve 72D has an axially extending stepped hole 80 having a large-diameter portion shifted in the unbalanced direction. This hole 80 of the sleeve 72D is formed by drawing. According to this preferred embodiment, a larger imbalance can be canceled.

Figure 7:
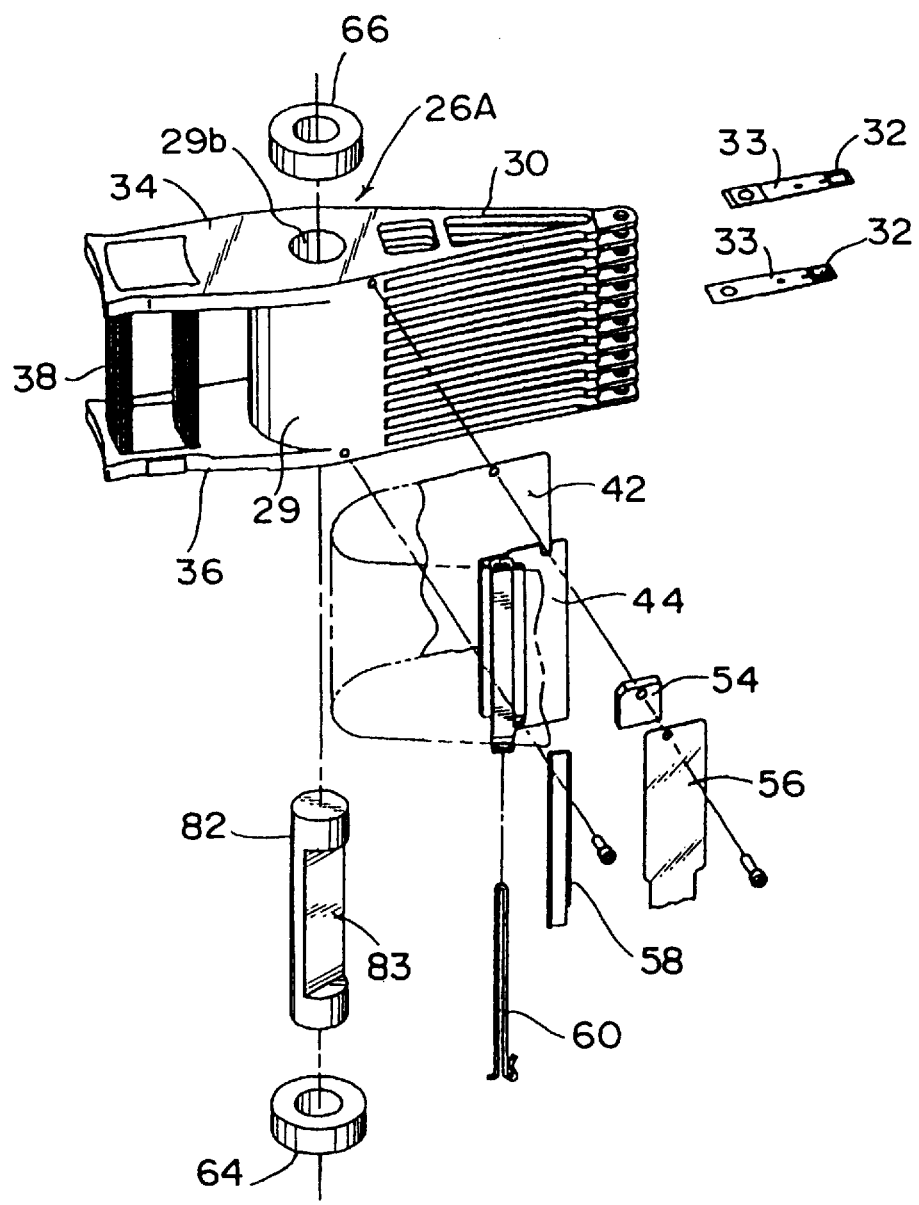
FIG. 7 is an exploded perspective view of a second preferred embodiment of the present invention.
Figure 8:
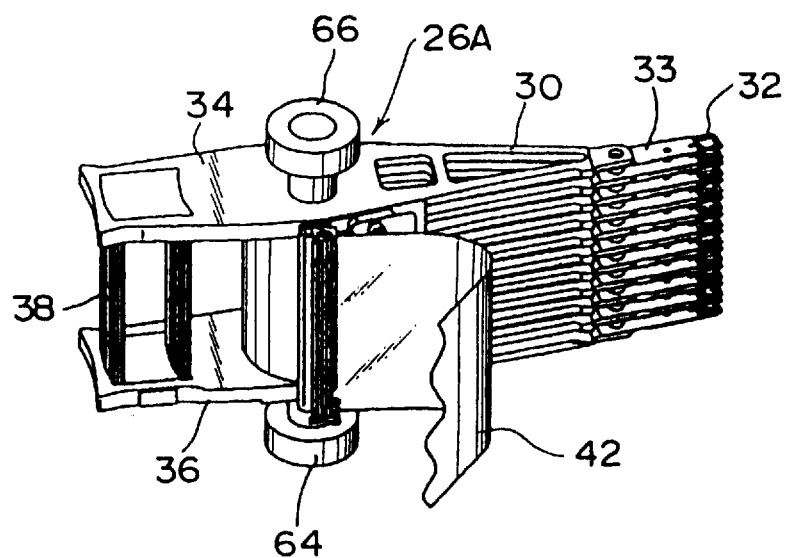
FIG. 8 is a perspective view of the second preferred embodiment.

Referring to FIG. 7, there is shown an exploded perspective view of a second preferred embodiment of the present invention. An actuator arm unit 26A in the second preferred embodiment has a structure in which the inner races of the bearings 64 and 66 are rotatable. That is, the outer race of the bearing 64 is fixed to the base 14, and the outer race of the bearing 66 is fixed to the cover 16. A shaft 82 is fixed at its lower and upper end portions to the inner race of the bearing 64 and the inner race of the bearing 66, respectively. Thus, the shaft 82 is rotatably supported by the bearings 64 and 66.

The side or cylindrical surface of the shaft 82 is partially cut to form a flat surface 83 facing in the unbalanced direction, that is, opposed to the fixed side of the FPC 42. The shaft 82 is press-fitted within a bore 29b axially formed through the actuator block 29. The bore 29b is smaller in diameter than the bore 29a shown in FIG. 3. Accordingly, the actuator arm unit 26A is rotatably mounted through the shaft 82 and the bearings 64 and 66 to the base 14 and the cover 16. According to the second preferred embodiment, the side surface of the shaft 82 is partially removed by machining to produce an imbalance in the shaft 82, thereby canceling the imbalance of the actuator arm assembly 22.

Figures 9A, 9B:
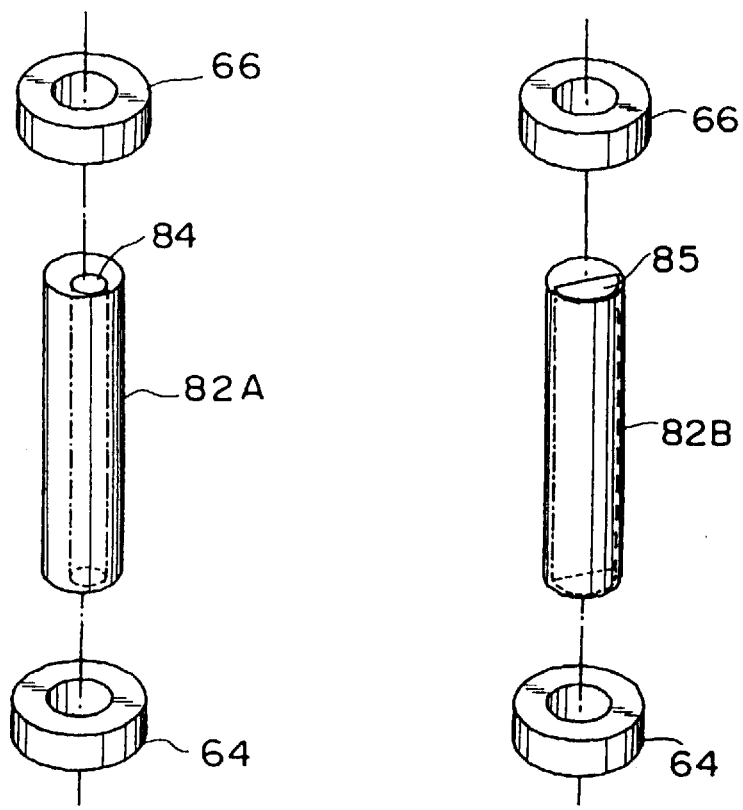
FIGS. 9A and 9B are perspective views showing other preferred embodiments of a shaft shown in FIG. 7.

FIGS. 9A and 9B show other preferred embodiments of the shaft 82. In the preferred embodiment shown in FIG. 9A, a shaft 82A has an axially extending round hole 84 eccentric in the unbalanced direction. With this structure, imbalance is produced in the shaft 82A to thereby cancel the imbalance of the actuator assembly 22. While the axial hole 84 parallel to the axis of rotation of the actuator assembly 22 is formed by drilling, it may be formed by drawing to reduce the manufacturing cost. In the preferred embodiment shown in FIG. 9B, a shaft 82B has an axially extending sectoral hole 85 shifted in the unbalanced direction. This hole 85 of the shaft 82B is formed by drawing. According to this preferred embodiment, a larger imbalance can be canceled.

Figure 10:
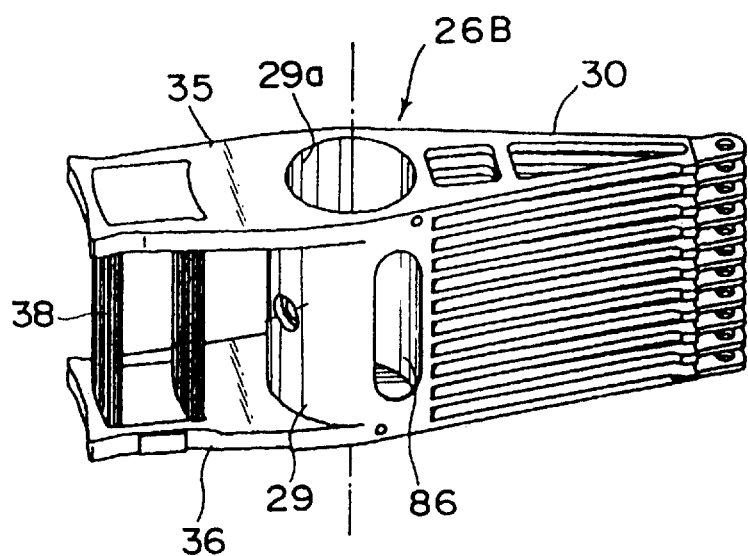
FIG. 10 is a perspective view of a third preferred embodiment of the present invention.

Referring to FIG. 10, there is shown a perspective view of a third preferred embodiment of the present invention. An actuator arm unit 26B in the third preferred embodiment has a structure in which a hole 86 is formed through the side surface of the actuator block 29 in a direction perpendicular to the axis of rotation of the actuator assembly 22 so as to open in the unbalanced direction, that is, open to the fixed side of the FPC 42. The formation of the hole 86 produces an imbalance in the actuator block 29 to thereby cancel the imbalance of the actuator assembly 22. While the preferred embodiment shown in FIG. 10 is of the type that the outer races of the bearings 64 and 66 are rotated, the other type that the inner races of the bearings 64 and 66 are rotated may be employed by reducing the diameter of the bore 29a shown in FIG. 10 like that of the bore 29b shown in FIG. 7 and press-fitting the shaft 82 shown in FIG. 7 within the small-diameter bore.

In each of the above preferred embodiments, the holes 73 or the like are formed preferably so that the rotational force created by the moving coil 38 rotates the actuator assembly 22 about a rotational axis that coincides with the center of gravity of the actuator assembly 22. With this arrangement, vibrations occurring in the actuator assembly 22 during the seek operation can be prevented.

According to the present invention described above, the imbalance of the actuator assembly can be easily removed with a simple structure, thereby contributing to the improvement in reliability and performance of the magnetic disk drive.

What is claimed is:

1. An actuator assembly for a disk drive having a base, comprising:

a shaft fixed to said base;

a bearing fixed to said shaft;

a sleeve fixed to said bearing, said sleeve having a generally cylindrical side wall formed with a hole therein, said hole being positioned on said generally cylindrical side wall to compensate for a rotational imbalance in said actuator assembly, and said hole being extended in a direction perpendicular to an axis of rotation of said actuator assembly;

an actuator arm unit fixed to said sleeve, said actuator arm unit having one end for supporting data read/write heads and another end for supporting a moving coil; and a flexible printed circuit sheet mounted on a side surface of an actuator block, for supplying a write signal to each head and for receiving a read signal from each head;

wherein said hole formed through said generally cylindrical side wall of said sleeve faces said flexible printed circuit sheet.

2. An actuator assembly for a disk drive according to claim 1, wherein said actuator arm unit comprises an actuator block fixed to said sleeve and a plurality of actuator arms extending from said actuator block in one direction, said actuator arms having front ends for supporting said data read/write heads.

3. An actuator assembly for a disk drive according to claim 1, wherein said hole is positioned so that a rotational force created by said moving coil rotates said actuator assembly about a rotational axis that coincides with a center of gravity of said actuator assembly.

4. An actuator assembly for a disk drive having a base, comprising:

a shaft fixed to said base;

a bearing fixed to said shaft;

a sleeve fixed to said bearing, said sleeve having a generally cylindrical side wall formed with a partially cutaway portion therein, whereby said partially cutaway portion shifts the center of gravity of said sleeve to compensate for a rotational imbalance in said actuator assembly, said cutaway portion being extended in a direction perpendicular to an axis of rotation of said actuator assembly;

an actuator arm unit fixed to said sleeve, said actuator arm unit having one end for supporting data read/write heads and another end for supporting a moving coil; and a flexible printed circuit sheet mounted on a side surface of an actuator block, for supplying a write signal to each head and for receiving a read signal from each head;

wherein said partially cutaway portion formed on said generally cylindrical outer side wall of said sleeve faces said flexible printed circuit sheet.

5. An actuator assembly for a disk drive according to claim 4, wherein said actuator arm unit comprises an actuator block fixed to said sleeve and a plurality of actuator arms extending from said actuator block in one direction, said actuator arms having front ends for supporting said data read/write heads.

6. An actuator assembly for a disk drive according to claim 4, wherein said partially cutaway portion is positioned so that a rotational force created by said moving coil rotates said actuator assembly about a rotational axis that coincides with a center of gravity of said actuator assembly.

7. An actuator assembly for a disk drive having a base, comprising:

a shaft fixed to said shaft;

a bearing fixed to said shaft;

a generally cylindrical sleeve fixed to said bearing, said generally cylindrical sleeve having a central axis and an axial hole that is eccentric from said central axis to compensate for a rotational imbalance in said actuator assembly;

an actuator arm unit fixed to said generally cylindrical sleeve, said actuator arm unit having one end for supporting data read/write heads and another end for supporting a moving coil; and a flexible printed circuit sheet mounted on a side surface of said actuator block, for supplying a write signal to each head and for receiving a read signal from each head;

wherein said eccentric axial hole of said generally cylindrical sleeve is eccentric in a direction toward said flexible printed circuit sheet.

8. An actuator assembly for a disk drive according to claim 7, wherein said actuator arm unit comprises an actuator block fixed to said generally cylindrical sleeve and a plurality of actuator arms extending from said actuator block in one direction, said actuator arms having front ends for supporting said data read/write heads.

9. An actuator assembly for a disk drive having a base, comprising:

a bearing fixed to said base;

a shaft fixed to said bearing, said shaft having a generally cylindrical outer side surface formed with a partially cutaway portion therein, said partially cutaway portion being formed on said generally cylindrical outer side surface to compensate for a rotational imbalance in said actuator assembly;

an actuator arm unit fixed to said shaft, said actuator arm unit having one end for supporting data read/write heads and another end for supporting a moving coil; and a flexible printed circuit sheet mounted on a side surface of said actuator block, for supplying a write signal to each head and for receiving a read signal from each head;

wherein said partially cutaway portion formed on said generally cylindrical outer side surface of said shaft faces said flexible printed circuit.

10. An actuator assembly for a disk drive according to claim 9, wherein said actuator arm unit comprises an actuator block fixed to said shaft and a plurality of actuator arms extending from said actuator block in one direction, said actuator arms having front ends for supporting said data read/write heads.

11. An actuator assembly for a disk drive according to claim 9, wherein said partially cutaway portion is positioned so that a rotational force created by said moving coil rotates said actuator assembly about a rotational axis that coincides with a center of gravity of said actuator assembly.

12. An actuator assembly for a disk drive according to claim 9, wherein said bearing further comprises an inner race and an outer race, said inner race being fixed to said shaft and said outer race being fixed to said base of said actuator assembly.

13. An actuator assembly for a disk drive having a base, comprising:

a bearing fixed to said base;

a generally cylindrical shaft fixed to said bearing, said generally cylindrical shaft having a central axis and an axial hole that is eccentric from said central axis to compensate for a rotational imbalance in said actuator assembly;

an actuator arm unit fixed to said generally cylindrical shaft, said actuator arm unit having one end for supporting data read/write heads and another end for supporting a moving coil; and a flexible printed circuit sheet mounted on a side surface of said actuator block, for supplying a write signal to each head and taking out a read signal from each head;

wherein said eccentric axial hole of said generally cylindrical shaft is eccentric in a direction toward said flexible printed circuit sheet.

14. An actuator assembly for a disk drive according to claim 13, wherein said actuator arm unit comprises an actuator block fixed to said generally cylindrical shaft and a plurality of actuator arms extending from said actuator block in one direction, said actuator arms having from ends for supporting said data read/write heads.

15. An actuator assembly for a disk drive according to claim 13, wherein said bearing further comprises an inner race and an outer race, said inner race being fixed to said shaft and said outer race being fixed to said base of said actuator assembly.

16. An actuator assembly for a disk drive having a base, comprising:

a shaft fixed to said base;

a bearing fixed to said shaft;

a sleeve fixed to said bearing; and an actuator arm unit fixed to said sleeve, said actuator arm unit having one end for supporting a moving coil;

wherein said actuator arm unit comprises an actuator block fixed to said sleeve and a plurality of actuator arms extending from said actuator block in one direction, said actuator arms having front ends for supporting said data read/write heads; and said actuator block having a generally axially extending side portion that substantially surrounds said sleeve, said side portion having a hole to compensate for a rotational imbalance in said actuator assembly, said hole being extended in a direction perpendicular to an axis of rotation of said actuator assembly; and a flexible printed circuit sheet mounted on said side portion of said actuator block, for supplying a write signal to each head and for receiving a read signal from each head;

wherein said hole of said actuator block faces toward said flexible printed circuit sheet.

17. An actuator assembly for a disk drive according to claim 16, wherein said hole is positioned so that a rotational force created by said moving coil rotates said actuator assembly about a rotational axis that coincides with a center of gravity of said actuator assembly.

18. A disk drive comprising:

a housing having a base;

a disk rotatably mounted in said housing and having a plurality of tracks;

a head for reading/writing data on said disk; and an actuator assembly mounted in said housing for moving said head across the tracks of said disk; said actuator assembly including a shaft fixed to said base;

a bearing fixed to said shaft;

a sleeve fixed to said bearing, said sleeve having a side wall formed with a hole opening in a direction of canceling imbalance of said actuator assembly, said hole being extended in a direction perpendicular to an axis of rotation of said actuator assembly;

an actuator arm unit fixed to said sleeve, said actuator arm unit having one end for supporting said head and another end for supporting a moving coil; and a flexible printed circuit sheet mounted on a side surface of an actuator arm unit, for supplying a write signal to said head and taking out a read signal from said head;

wherein said hole formed through said side wall of said sleeve is directed to a position where said flexible printed circuit sheet is mounted.

19. A disk drive comprising:

a housing having a base;

a disk rotatably mounted in said housing and having a plurality of tracks;

a head for reading/writing data on said disk; and an actuator assembly mounted in said housing for moving said head across the tracks of said disk; said actuator assembly comprising:

a bearing fixed to said base;

a shaft fixed to said bearing, said shaft having a side surface formed with a partially cutaway portion facing in a direction of canceling imbalance of said actuator assembly;

an actuator arm unit fixed to said shaft, said actuator arm unit having one end for supporting said head and another end for supporting a moving coil; and a flexible printed circuit sheet mounted on a side surface of said actuator block, for supplying a write signal to said head and taking out a read signal form said head;

wherein said partially cutaway portion formed on said side surface of said shaft is directed to a position where said flexible printed circuit sheet is mounted.

20. An actuator assembly for a disk drive according to claim 19, wherein said bearing further comprises an inner race and an outer race, said inner race being fixed to said shaft and said outer race being fixed to said base of said actuator assembly.

* * * * *